(12) United States Patent
Chaves

(10) Patent No.: US 6,510,414 B1
(45) Date of Patent: Jan. 21, 2003

(54) SPEECH RECOGNITION ASSISTED DATA ENTRY SYSTEM AND METHOD

(75) Inventor: Gerardo Chaves, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/412,891

(22) Filed: Oct. 5, 1999

(51) Int. Cl.⁷ .............................................. G10L 21/00
(52) U.S. Cl. .................. 704/270; 704/270.1; 379/88.01
(58) Field of Search ................................ 704/270, 275, 704/270.1; 379/88.01, 218, 219, 221, 430, 93.23, 93.34; 370/352

(56) References Cited

U.S. PATENT DOCUMENTS

| | | | |
|---|---|---|---|
| 3,975,589 A | 8/1976 | Ebner et al. ............. 179/2 AM |
| 4,166,980 A | 9/1979 | Apostolos et al. .......... 325/363 |
| 4,363,102 A | 12/1982 | Holmgren et al. .......... 364/513 |
| 4,469,038 A | 9/1984 | Fujikawa .................... 112/277 |
| 4,694,493 A | 9/1987 | Sakoe ......................... 381/42 |
| 4,737,976 A | 4/1988 | Borth et al. .................. 379/58 |
| 4,757,186 A | 7/1988 | Heberle et al. ............. 235/380 |
| 4,757,525 A | 7/1988 | Matthews et al. ............ 379/89 |
| 4,818,854 A | 4/1989 | Davies et al. ............... 235/381 |
| 4,827,518 A | 5/1989 | Feustel et al. ................ 381/42 |
| 4,850,005 A | 7/1989 | Hashimoto .................... 379/51 |
| 4,853,953 A | 8/1989 | Fujisaki ....................... 379/88 |
| 4,866,778 A | 9/1989 | Baker .......................... 381/43 |
| 4,897,865 A | 1/1990 | Canuel ......................... 379/91 |
| 4,910,782 A | 3/1990 | Watari ......................... 381/42 |
| 4,947,028 A | 8/1990 | Gorog ......................... 235/381 |
| 4,959,855 A | 9/1990 | Daudelin ..................... 379/213 |
| 4,965,821 A | 10/1990 | Bishop et al. ................ 379/91 |
| 4,999,806 A | 3/1991 | Chernow et al. ........... 364/900 |
| 5,018,141 A | 5/1991 | Kim ........................ 370/110.1 |
| 5,027,406 A | 6/1991 | Roberts et al. ............... 381/43 |
| 5,125,077 A | 6/1992 | Hall ........................... 395/275 |
| 5,127,043 A | 6/1992 | Hunt et al. .................... 379/88 |
| 5,163,086 A | 11/1992 | Ahearn et al. ................ 379/91 |
| 5,164,981 A | 11/1992 | Mitchell et al. .............. 379/88 |
| 5,181,238 A | 1/1993 | Medamana et al. .......... 379/95 |
| 5,208,745 A | 5/1993 | Quentin et al. ............. 364/188 |
| 5,210,789 A | 5/1993 | Jeffus et al. ................ 379/127 |
| 5,227,612 A | 7/1993 | Le Roux .................... 235/379 |
| 5,251,283 A | 10/1993 | Honis ............................ 395/2 |
| 5,267,299 A | 11/1993 | Nomura ....................... 379/88 |
| 5,274,695 A | 12/1993 | Green ......................... 379/88 |
| 5,297,194 A | 3/1994 | Hunt et al. .................... 379/88 |
| 5,329,589 A | 7/1994 | Fraser et al. .................. 379/91 |
| 5,333,181 A | 7/1994 | Biggs ........................... 379/91 |
| 5,365,050 A | 11/1994 | Worthington et al. ....... 235/472 |
| 5,386,494 A | 1/1995 | White ....................... 395/2.84 |
| 5,388,148 A | 2/1995 | Seiderman ................... 379/59 |
| 5,389,917 A | 2/1995 | LaManna et al. ......... 340/825.3 |
| 5,402,474 A | 3/1995 | Miller et al. .................. 379/93 |
| 5,448,768 A | 9/1995 | Zinser ....................... 455/108 |
| 5,467,475 A | 11/1995 | Takahashi et al. .......... 395/800 |
| 5,473,726 A | 12/1995 | Marshall ..................... 395/2.4 |
| 5,510,606 A | 4/1996 | Worthington et al. ....... 235/472 |
| 5,517,558 A | 5/1996 | Schalk ......................... 379/88 |
| 5,528,670 A | 6/1996 | Elliot et al. ................... 379/89 |
| 5,561,707 A | 10/1996 | Katz ............................ 379/88 |
| 5,619,708 A | 4/1997 | Ho ............................. 395/767 |
| 5,632,002 A | 5/1997 | Hashimoto et al. .......... 395/2.4 |

(List continued on next page.)

Primary Examiner—Susan McFadden
(74) Attorney, Agent, or Firm—Baker Botts L.L.P.

(57) ABSTRACT

A speech recognition assisted data entry system includes a computing system and a speech recognition application operable to run on the computing system. The speech recognition application is operable to receive data from a caller and convert the data to recognizable characters. The system also includes a converted cache operable to store the recognizable characters. The system further includes a set of recognition rules operable to be applied to the recognizable characters in the converted cache to automatically determine the recognizable characters corresponding to a data entry field of a data entry application.

23 Claims, 4 Drawing Sheets

U.S. PATENT DOCUMENTS

| | | | | |
|---|---|---|---|---|
| 5,649,061 | A | 7/1997 | Smyth | 395/20 |
| 5,664,061 | A | 9/1997 | Andreshak et al. | 704/275 |
| 5,673,306 | A | 9/1997 | Amadon et al. | 379/59 |
| 5,682,526 | A | 10/1997 | Smokoff et al. | 395/615 |
| 5,684,863 | A | 11/1997 | Katz | 379/88 |
| 5,698,834 | A | 12/1997 | Worthington et al. | 235/472 |
| 5,726,984 | A | 3/1998 | Kubler et al. | 370/349 |
| 5,748,711 | A | 5/1998 | Scherer | 379/91.02 |
| 5,749,000 | A | 5/1998 | Narisawa | 396/121 |
| 5,751,260 | A | 5/1998 | Nappi et al. | 345/8 |
| 5,774,858 | A | 6/1998 | Taubkin et al. | 704/273 |
| 5,787,156 | A | 7/1998 | Katz | 379/93.13 |
| 5,793,846 | A | 8/1998 | Katz | 379/88 |
| 5,815,551 | A | 9/1998 | Katz | 379/88 |
| 5,815,810 | A | 9/1998 | Gallant et al. | 455/433 |
| 5,819,225 | A | 10/1998 | Eastwood et al. | 704/275 |
| 5,822,727 | A | 10/1998 | Garberg et al. | 701/243 |
| 5,828,734 | A | 10/1998 | Katz | 379/93.13 |
| 5,872,833 | A | 2/1999 | Scherer | 379/91.02 |
| 5,873,070 | A | 2/1999 | Bunte et al. | 705/28 |
| 6,011,844 | A * | 1/2000 | Uppaluru et al. | 379/220 |
| 6,102,970 | A * | 8/2000 | Kniepp | 717/9 |
| 6,157,705 | A * | 12/2000 | Perrone | 379/88.01 |
| 6,167,253 | A * | 12/2000 | Farris et al. | 455/412 |
| 6,195,697 | B1 * | 2/2001 | Bowman-Amuah | 709/224 |

* cited by examiner

SPEECH RECOGNITION ASSISTED DATA ENTRY SYSTEM AND METHOD

TECHNICAL FIELD OF THE INVENTION

The present invention relates generally to the field of data entry, and more particularly, to a speech recognition assisted data entry system and method.

BACKGROUND OF THE INVENTION

Modern businesses and other organizations often employ a call center staffed with a group of call center agents to communicate with persons regarding the business or organization. For example, a person wishing to place a product order with a business may place a telephone call to the business and be directed to the call center so that one of the call center agents may record information from the person necessary to complete the product order transaction. Additionally, call centers may be used as a central source of information for persons seeking additional data about the organization. Call center agents may also be used to solicit business by placing telephone calls to potential customers, such as in telemarketing.

Call center agents generally retrieve information about the business or organization using a computer or other information source. Call center agents also generally input caller data directly into a data entry application displayed on a computer. For example, a caller's name, address, and credit card number may be directly input to order application software displayed on the computer. Additionally, call center agents may use the computer to access data previously received from a caller. The caller data input to the data entry application may then be transferred to or accessed by other appropriate departments within the business or organization for further processing.

Speech recognition applications may also be used to assist data collection from a caller. For example, speech recognition engines may be used as an automated information directory. The caller may be requested to speak a particular word or enter a particular digit from a telephone keypad to access various departments of a business. The speech recognition application may also be used to gather and record information from the caller prior to connecting the caller to the call center agent. For example, a caller may be requested to speak or enter an account number, the caller's last name, or the last name of a person the caller is trying to contact. When the caller is connected to the call center agent, the recorded caller information may be displayed to the call center agent to assist the call center agent in further assisting the caller.

However, data collection and interaction between a caller and a call center agent suffers several disadvantages. For example, after initial information is received from a caller, the caller may be forwarded to a call center agent to further define or receive additional information from the caller. However, the caller generally does not have the option to convey information using a telephone keypad because the call center agent cannot distinguish DTMF tones from a telephone keypad. Additionally, further information received from the caller must be written or typed into a computer application by the call center agent. Entering the additional information may be tedious, time consuming, and monotonous for a call center agent over the course of the average business work day. Thus, over time, the accuracy of the information input by the call center agent may decrease.

SUMMARY OF THE INVENTION

Accordingly, a need has arisen for a speech recognition assisted data entry system and method that provides greater accuracy and flexibility than prior data entry systems. The present invention provides a speech recognition assisted data entry system and method that addresses shortcomings of prior systems and methods.

According to one embodiment of the present invention, a speech recognition assisted data entry system includes a computing system and a speech recognition application operable to run on the computing system. The speech recognition application is operable to receive data from a caller and convert the data to recognizable characters. The system also includes a converted cache operable to store the recognizable characters. The system further includes a set of recognition rules operable to be applied to the recognizable characters in the converted cache to automatically determine the recognizable characters corresponding to a data entry field of a data entry application.

According to another embodiment of the present invention, a method for speech recognition assisted data entry includes receiving a communication connection with a caller and receiving data from the caller via the communication connection. The method also includes converting the data to recognizable characters using a speech recognition application and storing the recognizable characters in a converted cache. The method further includes applying a set of recognition rules to the recognizable characters stored in the converted cache to automatically determine the recognizable characters corresponding to a data entry field of a data entry application.

The technical advantages of the present invention include providing a speech recognition assisted data entry system that provides greater privacy for the caller when conveying numerical information. For example, according to one aspect of the present invention, a call center agent may activate a speech recognition application to receive requested numerical information from a caller. In response to a request for the numerical information from the call center agent, the caller may use a telephone keypad to input the requested numerical information. The numerical information may be received by the speech recognition application and displayed to the call center agent, thereby allowing the call center agent to input the numerical data into a data collection application.

Another technical advantage of the present invention includes a speech recognition assisted data entry system providing greater efficiency than prior systems. For example, the call center agent may interactively initiate a speech recognition application to input information received from a caller directly into a data collection application. For example, the call center agent may place a curser at a particular location in a display of the data collection application corresponding to requested information from the caller. The call center agent may then activate the speech recognition application to automatically collect and input the information received from the caller into the data collection application.

Another technical advantage of the present invention includes efficient interaction between a caller and a call center agent. For example, the call center agent may activate a speech recognition application to automatically convert data received from the caller to recognizable characters displayed on a computer. A set of recognition rules may be applied to the characters to automatically identify the characters corresponding to particular data entry fields of a data collection application. After the characters have been identified as corresponding to a particular data entry field, the characters may be automatically input into the data entry field or input into the data entry field by the call center agent.

Other technical advantages of the present invention will be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in connection with the accompanying drawings, in which.

DETAILED DESCRIPTION OF THE INVENTION

The present invention provides various modes of speech recognition assisted data entry for efficient and accurate input of data into a data entry application. Among other things, the present invention may be operated such that incoming data from a caller is continuously and automatically converted to recognizable characters using a speech recognition application. Additionally, the system may apply a set of recognition rules to the recognizable characters to automatically identify and input those characters into corresponding data entry fields of the data entry application. The present invention may also be operated in an interactive mode such that a call center agent may designate a particular data entry field in preparation for receiving data from the caller corresponding to that data entry field. The call center agent may then activate the speech recognition application to automatically convert and input the data received from the caller into the particular data entry field.

Embodiments of the present invention and the advantages thereof are best understood by referring to the following description and drawings, wherein like numerals are used for like and corresponding parts of the various drawings.

Figure 1:
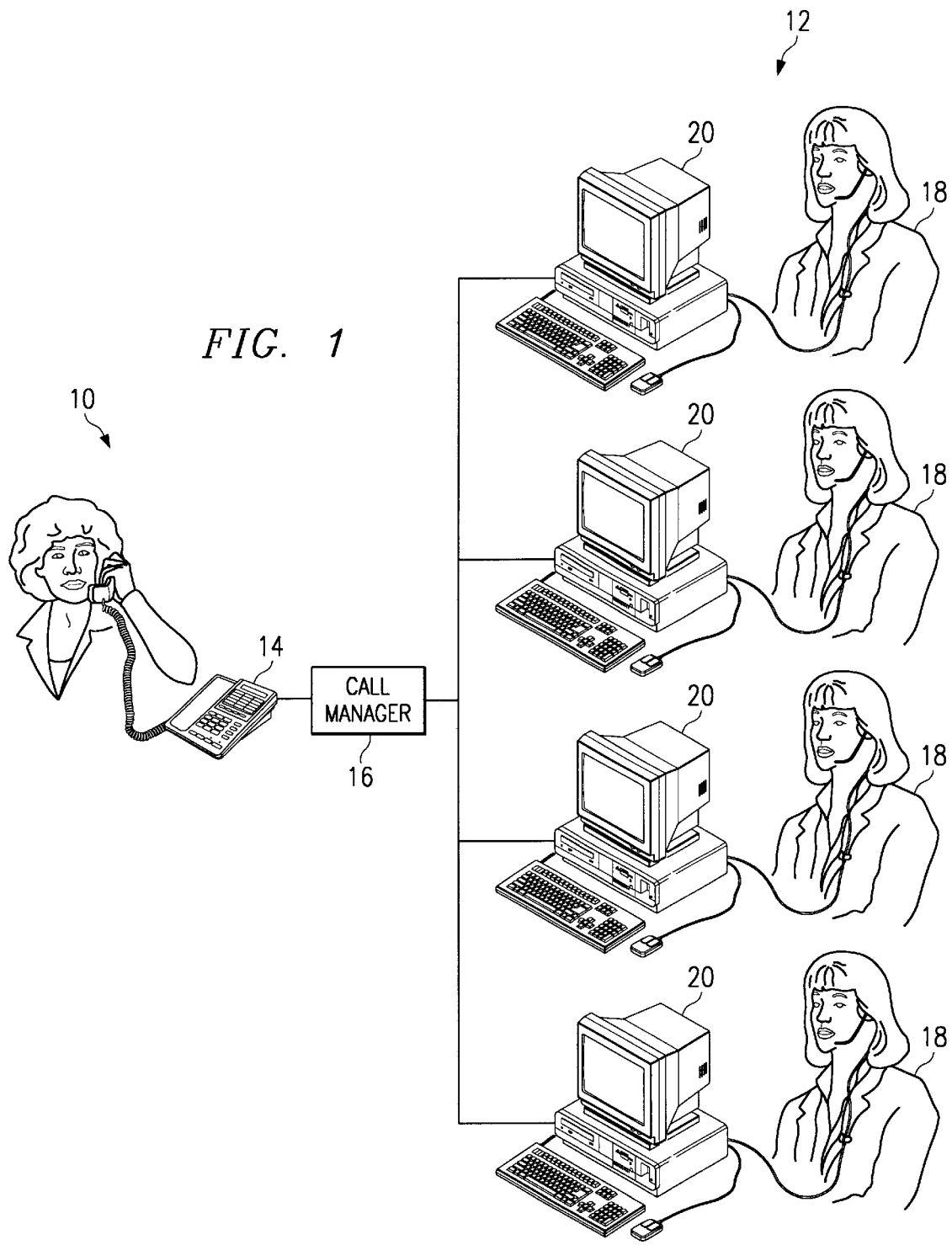
FIG. 1 is a diagram illustrating an exemplary communication connection between a caller and a call center in accordance with an embodiment of the present invention.

FIG. 1 illustrates a global communication connection between a caller 10 and a call center 12. Caller 10 may communicate with call center 12 using a telephone 14 via a public switched telephone network. Caller 12 may also communicate with call center 12 using a computer (not explicitly shown) via an Internet service provider. For example, caller 10 may communicate with call center 12 over the Internet using voice over IP (Internet protocol).

Call center 12 comprises a call manager 16 and call center agents 18. Call manager 16 receives and directs communication connections from one or more callers 10 to an available call center agent 18. Each call center agent 18 generally receives information from a caller 10 and inputs the information into software data entry applications using a computer, work station, or other computing system 20. For example, call center agents 18 may input information such as name, address, and billing information for sending product literature to a caller 10, placing a product order for a caller 10, or confirming information previously received from a caller 10. The data input by the call center agents 18 may then be transferred to or accessed by appropriate departments of an enterprise for further processing. Thus, during the course of an average business day, massive quantities of data may be received and input by a single call center agent 18. Therefore, accuracy of the data input by the call center agents 18 is imperative to ensure efficient operation of the enterprise.

Figure 2:
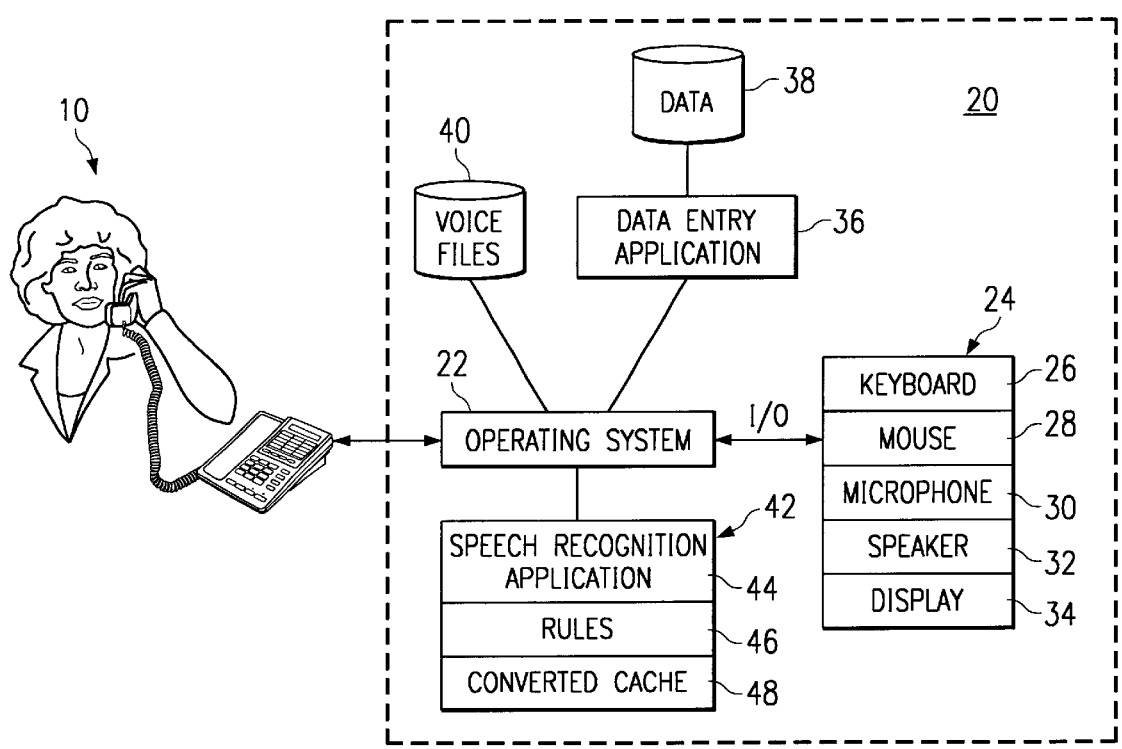
FIG. 2 is a block diagram illustrating an exemplary speech recognition assisted data entry system in accordance with an embodiment of the present invention.

FIG. 2 illustrates an exemplary computing system 20 operated by a call center agent 18 to receive and input information received from a caller 10. Computing system 20 comprises computer software that may be loaded into a memory of computing system 20 and executed by a processor of computing system 20. Computer software may generally be identified by modules, engines, applications, and similar systems. It will be understood that the computer software may be otherwise combined and/or divided for processing within the scope of the present invention. Accordingly, labels of the modules and other software systems are for illustrative purposes and may be varied and still remain within the scope of the present invention.

The computer software may be loaded into the memory of computing system 20 from disk storage (not explicitly shown). Disk storage may comprise a variety of types of storage media, including, but not limited to, floppy disk drives, hard disk drives, CD-ROM drives, or magnetic tape drives. Once enabled, the memory of computing system 20 may be used to store an operating system 22. Operating system 22 may comprise a "Microsoft Windows" operating system; however, it will be understood that different types of operating systems may be used within the scope of the present invention.

Computing system 20 also comprises an input/output (I/O) system 24. I/O system 24 may comprise a keyboard 26, a trackpad or mouse 28, a microphone 30, or other suitable input devices allowing a call center agent 18 to provide input to computing system 20. I/O system 24 may also comprise earphones or a speaker 32, a display 34, or other suitable output devices accessible by the call center agent 18 to receive an output from computing system 20.

Computing system 20 also comprises a data entry application 36. Data entry application 36 may comprise data entry fields for receiving data input to the data entry application by the call center agent 18. Computing system 20 may also comprise a database 38 for storing the data input into the data entry fields of the data entry application 36. In one embodiment, data entry application 36 may comprise data entry fields for a name, a street address, a city, a state, a zip code, a phone number, and billing information, such as a credit card number. Data entry application 36 may also comprise other data entry fields for gathering relevant information from a caller 10.

Computing system 20 may also comprise voice files 40. Voice files 40 may comprise recorded phrases or messages used by a call center agent 18 to assist the call center agent 18 in communicating with and acquiring information from a caller 10. For example, voice files 40 may comprise a recorded greeting or a recorded request for information corresponding with a particular data entry field of the data entry application 36. Voice files 40 may be accessed by a call center agent 18, converted to audio signals, and transmitted to a caller 10. For example, voice files 40 may be stored as .wav files or other suitable audio file formats.

Computing system 20 also comprises a speech recognition system 42. Speech recognition system 42 comprises a speech recognition application 44. Speech recognition application 44 comprises systems operable to recognize speech components and dual tone multifrequency (DTMF) signals and convert the speech components and DTMF signals to recognized words or characters, such as text and numerals. Speech recognition application 44 may also comprise code associated with programmatic routines for converting characters to speech or audio signals. For example, speech recognition application 44 may comprise routines operable to use Microsoft's Speech API, which may be used to access native capabilities for speech recognition and text-to-speech conversion.

Speech recognition system 42 may also comprise a set of recognition rules 46 and a converted cache 48. Converted cache 48 may comprise recognizable characters converted from incoming data received from caller 10 using speech recognition application 44. For example, in one mode of operation, speech recognition application 44 may be activated to continuously and automatically convert all data received from a caller 10 to recognizable characters. The converted characters may be stored in converted cache 48 for input into data entry application 36.

Recognition rules 46 comprise rules or information to determine and identify recognizable characters corresponding to data entry fields of data entry application 36. For example, recognition rules 46 may comprise information for identifying nine numerical characters as a phone number, five numerical characters as a zip code, and sixteen numerical characters as a credit card number. Recognition rules 40 may also comprise information for determining and identifying recognizable non-numerical characters corresponding to data entry fields of data entry application 36. For example, recognition rules 46 may comprise listings or tables of cities, states, countries, and country codes. Recognition rules 46 may also comprise dictionary or other suitable resources to determine and identify other numerical and non-numerical characters corresponding to data entry fields.

Recognition rules 46 may also comprise nested tables of information to determine and identify recognizable characters corresponding to data entry fields of data entry application 36. For example, after a particular city has been identified as corresponding to a city data entry field, a table of street names for that particular city may be applied to identify other converted recognizable characters corresponding to a street address data entry field. Further, after a street name has been identified for the particular city, another nested table of building numbers for the particular street name may be applied to identify recognized characters for the street address data entry field. Thus, recognition rules 46 may also be used to identify a combination of numerical and non-numerical characters corresponding to data entry fields.

After identifying recognizable characters corresponding to a data entry field of data entry application 36, speech recognition system 42 may highlight or otherwise indicate the characters corresponding to a specific data entry field. For example, a function key may be associated with a particular data entry field of data entry application 36. Speech recognition system 42 may indicate the appropriate function key for converted characters corresponding to a particular data entry field. Thus, a call center agent 18 may view the indicated characters and the function keys associated with the indicated characters and select the appropriate function key to input the indicated characters into the corresponding data entry field. Speech recognition system 42 may also be configured to automatically input the identified characters into a corresponding data entry field of data entry application 36 without call center agent 18 intervention.

In one mode of operation, recognition rules 44 may be used to manage the input of data received from a caller 10 into data entry application 36. For example, a communication connection from a caller 10 may be transferred through call manager 16 to a call center agent 18. Upon receiving the communication connection from caller 10, call center agent 18 may request information from caller 10 for input into data entry application 36 which may be displayed to call center agent 18 using display 34. Call center agent 18 may request the information from caller 10 using microphone 30 or may access voice files 40 to transmit a recorded greeting or request for information to caller 10.

Call center agent 18 may also activate speech recognition application 44 to continuously and automatically convert information received from caller 10 to recognizable characters. The information received from caller 10 may be in the form of speech components, DTMF signals, or other types of signals recognizable by speech recognition application 44. The recognizable characters may be stored in converted cache 48 and displayed to call center agent 18 using display 34. Call center agent 18 may also actively listen to information received from caller 14 using speaker 32 while speech recognition application 44 converts the information to recognizable characters.

Recognition rules 46 may then be applied to determine and identify recognizable characters corresponding to data entry fields of data entry application 36. As described above, recognition rules 46 may comprise dictionary resources, tables of information, and other information resources to identify recognizable characters corresponding to data entry fields of data entry application 36. Once identified, the characters may be highlighted or otherwise indicated to call center agent 18 as corresponding to particular data entry fields. Call center agent 18 may then input the characters into the appropriate data entry field using mouse 28, keyboard 26, or other suitable input devices. Additionally, speech recognition system 42 may be configured to automatically input the characters into corresponding data entry fields without call center agent 18 intervention.

Therefore, the present invention provides increased accuracy of data input by minimizing call center agent 18 intervention and substantially eliminating erroneous data input. For example, recognition rules 46 may be used to minimize call center agent 18 intervention by identifying recognizable characters converted using speech recognition application 44 corresponding to data entry fields of data entry application 36, thereby substantially eliminating the manual and tedious entry of large amounts of data by call center agent 18.

Additionally, call center agent 18 may access voice files 40 to confirm information received from caller 10. For example, voice files 40 may be combined with information input into data entry application 36 or stored in converted cache 48. For example, after recognition rules 46 identify characters corresponding to a particular data entry field, the call center agent 18 may retrieve a voice file 40 to combine with the identified characters to confirm correct receipt of the information. The call center agent 18 may highlight or otherwise identify the characters in the data entry field to confirm using mouse 28 or keyboard 26. Speech recognition application 44 may be used to convert the characters to audio signals for transmitting to the caller 10. Additionally, a voice file 40 may be converted to an audio signal, combined with the audio signal of the indicated characters, and the combined audio signals transmitted to caller 10. For example, a voice file 40 may comprise the recorded phrase "I received your credit card number as" and may be combined with indicated characters corresponding to a credit card number in a data entry field. Thus, the present invention provides additional accuracy of data input by confirming information received from a caller 10 with substantially reduced call center agent 18 intervention.

In accordance with another mode of operation, the call center agent 18 may interactively manage data input into data entry application 36. For example, the call center agent 18 may toggle speech recognition application 44 into an active and passive state to convert information received from caller 10 to recognizable characters for a particular data entry field. In this example, the call center agent 18 may place a cursor or otherwise indicate a data entry field in data entry application 36 in preparation for receiving information from the caller 10. The call center agent 18 may then request information from the caller 10 corresponding to the indicated data entry field and activate speech recognition application 44 to convert information received from caller 10 in response to the request of the call center agent 18. Thus, as speech recognition application 44 converts the information received from the caller 10 to recognizable characters, the characters are automatically input into the highlighted data entry field. After input of the data entry field information, speech recognition application 44 may be deactivated or toggled into a passive state until required by the call center agent 18 for another data entry field.

As described above, call center agent 18 may combine the data input into data entry application 36 with voice files 40 to confirm the information received from the caller 10. Additionally, call center agent 18 may actively listen to information received from caller 10 using speaker 32 while speech recognition application 44 converts the information into recognizable characters. The call center agent may also visually verify input of the characters into data entry application 36 using display 34 while speech recognition application 44 automatically inputs the information into a data entry field and while listening to the information using speaker 32. Thus, improved accuracy of the information input into the data entry application 36 is achieved by automatic conversion of the data using speech recognition application 44 and providing the call center agent 18 with audio and visual verification of the data input into the data entry application 36.

Thus, the present invention provides for interactive communication between a caller 10 and a call center agent 18 using speech recognition application 44 to provide increased accuracy of data input into data entry application 36. For example, speech recognition application 36 may be toggled into an active state corresponding to particular data entry fields in preparation for receiving data from the caller 10 associated with the particular data entry fields. Additionally, speech recognition application 44 may be toggled into an active state at various positions within a data entry field for input or correction of data within the data entry field. Thus, the present invention provides increased flexibility of data input operations.

Figure 3:
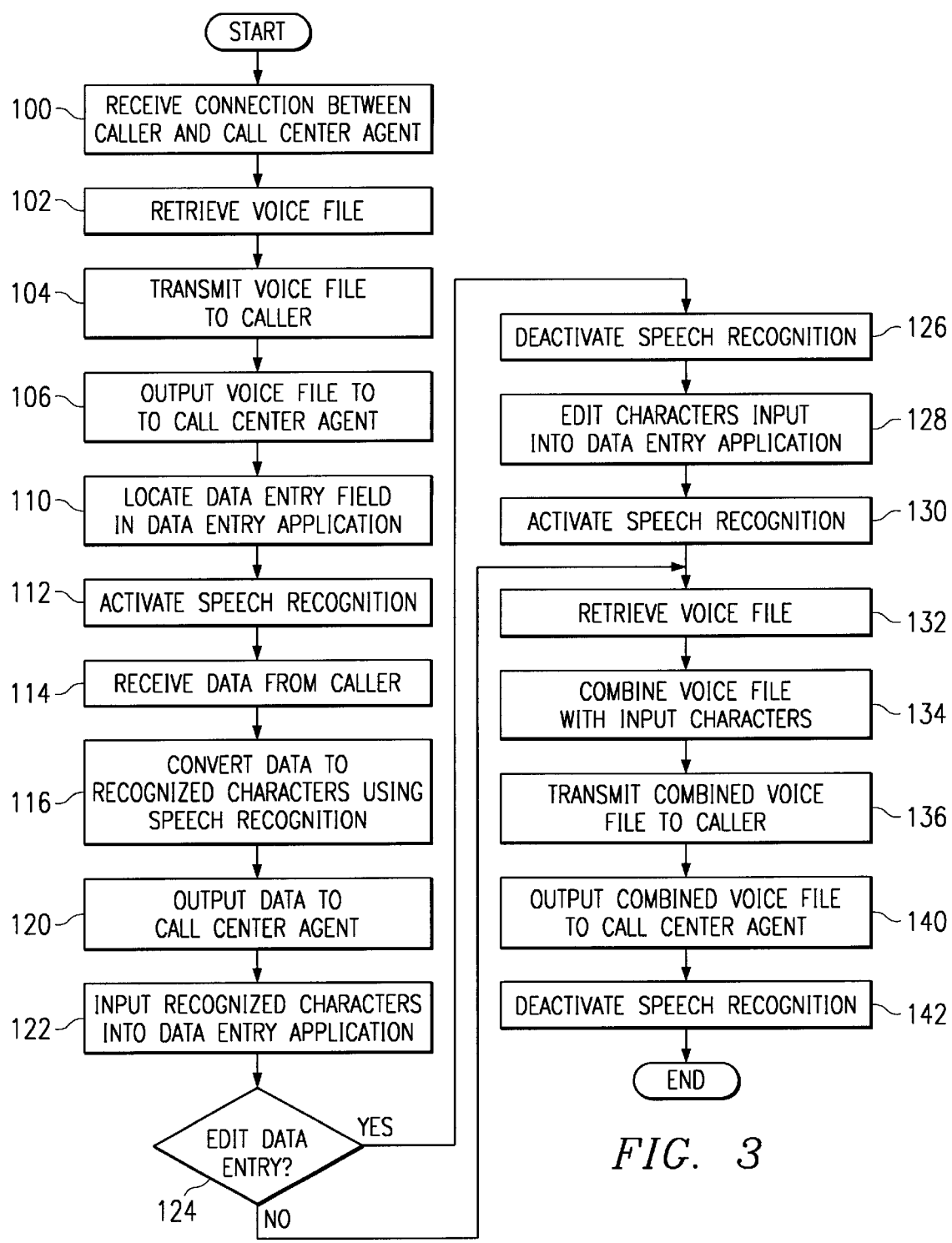
FIG. 3 is a flow diagram illustrating an exemplary method for speech recognition assisted data entry in accordance with an embodiment of the present invention.

FIG. 3 illustrates a method for speech recognition assisted data entry in accordance with an embodiment of the present invention. The method begins at step 100 where a communication connection or link is established between a caller 10 and a call center agent 18. At step 102, the call center agent 18 may retrieve a voice file 40. For example, the voice file 40 may be a recorded greeting or a recorded request for information from the caller 10. At step 104, the voice file 40 is converted to audio signals and transmitted to the caller 10 via the communication link. At step 106, the voice file 40 may be converted to audio signals and output to the call center agent 18 using speaker 32.

At step 110, the call center agent 18 may locate or indicate a data entry field in a data entry application 36 to receive data input. For example, the data entry application 36 may comprise a product order form having data entry fields relevant to processing a product order, such as a name, address, and billing information of the caller 10. At step 112, after indicating a data entry field, the call center agent 18 activates a speech recognition application 44 in preparation for receiving information from the caller 10. At step 114, data from the caller 10 is received. The data from the caller 10 is converted to recognizable characters using the speech recognition application 44 at step 116. At step 120, the data from the caller may also be output to the call center agent 18 using speaker 32. At step 122, the recognizable characters from the speech recognition application 44 are automatically entered into the data entry application 36.

At decisional step 124, the recognizable characters entered into the data entry application 36 may require editing. If modification to information entered into the data entry application 36 is not required, the method proceeds directly to step 132. If editing of the data is required, the method proceeds to step 126, where the speech recognition application 44 is deactivated or placed in a passive state. At step 128, the characters input to the data entry application 36 may be modified or edited by the call center agent 18. At step 130, the call center agent 18 may activate the speech recognition application 44 within a data entry field to automatically input additional recognizable characters converted using speech recognition application 44 into the data entry field.

At step 132, a recorded voice file 40 may be retrieved by the call center agent. At step 134, the retrieved voice file 40 may be combined with information entered into the data entry application 36. For example, information entered into the data entry application 36, such as a credit card number, may be combined with a recorded voice file 40 to confirm the accuracy of the input information. At step 136, the voice file 40 and data entry field information are converted to audio signals, combined, and transmitted to the caller 10 via the communication link. At step 140, the combined audio signals of the voice file 40 and data entry field information may be output to the call center agent 18 using speaker 32. At step 142, the speech recognition application may be deactivated or placed in a passive state awaiting further data for conversion.

Figure 4:
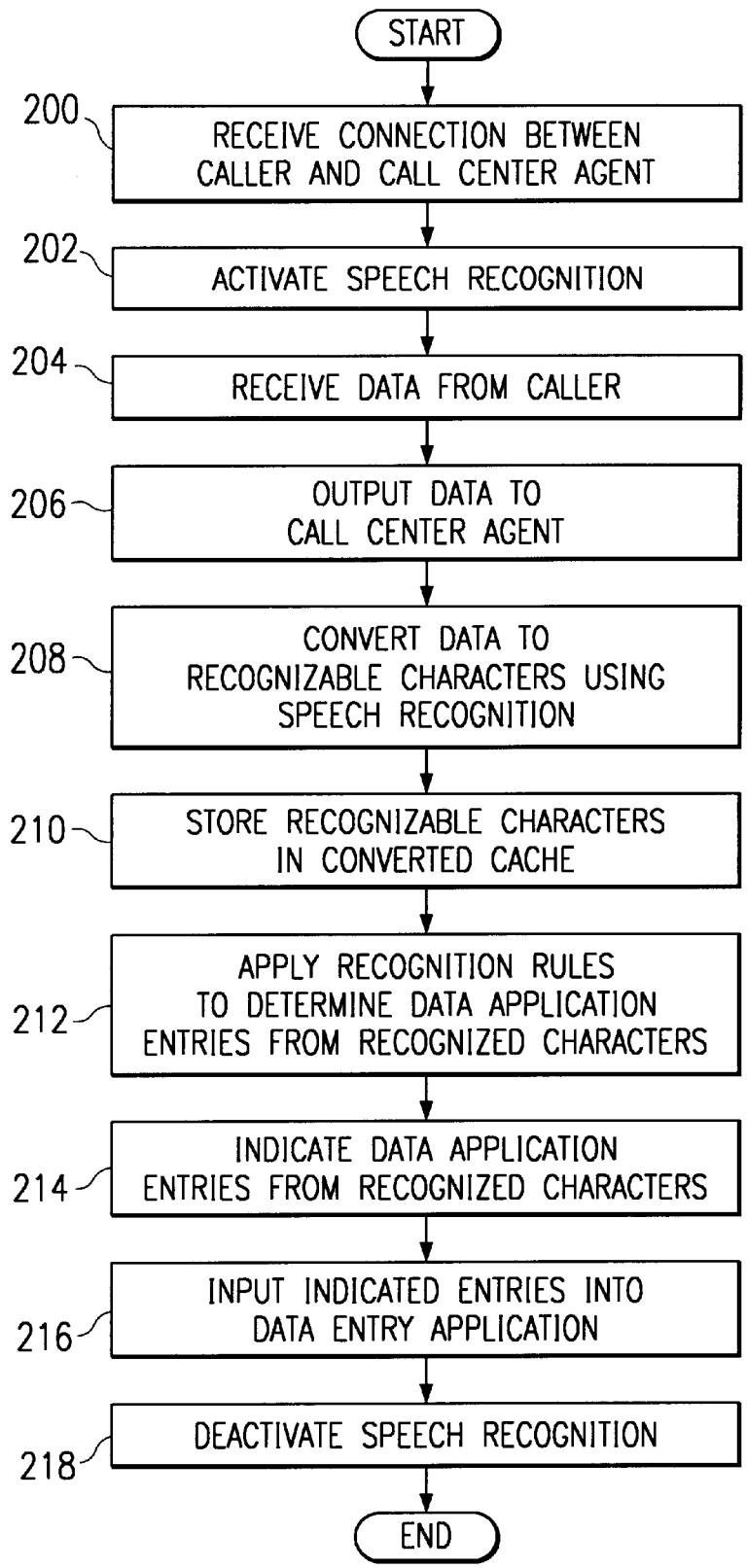
FIG. 4 is another flow diagram illustrating an exemplary method for speech recognition assisted data entry in accordance with an alternate embodiment of the present invention.

FIG. 4 is another method for speech recognition assisted data entry in accordance with an alternate embodiment of the present invention. In this embodiment, a communication connection or link is established between a caller 10 and a call center agent 18 at step 200. At step 202, a speech recognition application 40 is activated in preparation for receiving data from the caller 10. At step 204, data from the caller is received via the communication link. At step 206, data received from the caller 10 may be output to call center agent 18 using speaker 32.

At step 208, the speech recognition application 40 converts the data received from the caller 10 to recognizable characters. At step 210, the recognizable characters are stored in a converted cache 48 which may be displayed to the call center agent 18 using display 34. At step 212, a set of recognition rules 46 are applied to the recognizable characters to determine characters corresponding to data entry fields of a data entry application 36.

At step 214, the recognizable characters corresponding to data entry fields of the data entry application 36 may be highlighted or otherwise identified to notify the call center agent 18 of the characters corresponding to particular data entry fields. For example, once the characters are highlighted, a function key or other method of indication may be associated with a particular series of recognized characters corresponding to a particular data entry field. Thus, the call center agent 18 may use a keyboard 26 to depress a function key associated with the identified characters to automatically input the indicated characters into the corresponding data entry field. At step 216, the identified characters corresponding to a data entry field may be recorded in the data entry application 36. Alternatively, the present invention may also be configured to automatically enter the identified characters into the data entry application 36. At step 218, the speech recognition application 44 may be deactivated or placed into a passive state.

Although the present invention and the advantages thereof have been described in detail, it should be understood that various changes, substitutions, and alterations can be made therein without departing from the spirit and scope of the present invention as defined by the appended claims.

What is claimed is:

1. A speech recognition assisted data entry system comprising:
    a speech recognition system comprising a speech recognition application operable to be activated by a call center agent, the activated speech recognition application operable to receive data from a caller and convert the data to recognizable characters;
    a converted cache operable to store the recognizable characters;
    a set of recognition rules operable to be applied by the speech recognition system to the recognizable characters in the converted cache to automatically determine the recognizable characters corresponding to a data entry field of a data entry application; and
    a control system operable to:
        receive a first selection of a first data entry field from the call center agent;
        direct the speech recognition application to capture a first set of recognizable characters corresponding to the first data entry field in response to the first selection;
        receive a second selection of a second data entry field from the call center agent; and
        direct the speech recognition application to capture a second set of recognizable characters corresponding to the second data entry field in response to the second selection.

2. The system of claim 1, wherein the speech recognition assisted data entry system further comprises an input system accessible by the call center agent to input the recognizable characters corresponding to the data entry field into the data entry application.

3. The system of claim 2, wherein the speech recognition system is further operable to indicate to the call center agent the recognizable characters corresponding to the data entry field.

4. The system of claim 1, further comprising an output system operable to output the data received from the caller to an output device.

5. The system of claim 4, wherein the output device comprises a speaker operable to output audio signals of the data received from the caller.

6. The system of claim 1, wherein the speech recognition system is further operable to automatically input the recognizable characters corresponding to the data entry field into the data entry application.

7. The system of claim 1, wherein the speech recognition assisted data entry system further comprises a voice file, and is further operable to convert the voice file to an audio signal and transmit the audio signal to the caller.

8. The system of claim 1, wherein the speech recognition system is further operable to convert the characters corresponding to the data entry field to an audio signal and transmit the audio signal to the caller.

9. The system of claim 8, wherein the speech recognition assisted data entry system further comprises a voice file, and is further operable to convert the voice file to an audio signal, and to combine the audio signal of the voice file with the audio file of the characters corresponding to the data entry field and transmit the combined audio files to the caller.

10. A method for speech recognition assisted data entry comprising:
    initiating a communication connection between a caller and a call center agent;
    activating a speech recognition application in response to a request from the call center agent;
    receiving data from the caller via the communication connection;
    converting the data to recognizable characters using the speech recognition application;
    storing the recognizable characters in a converted cache;
    applying a set of recognition rules to the recognizable characters stored in the converted cache to automatically determine the recognizable characters corresponding to one or more data entry fields of a data entry application;
    indicating to the call center agent the recognizable characters that correspond to the one or more data entry fields;
    receiving one or more data confirmations from the call center agent; and
    entering the recognizable characters that correspond to the data entry fields into one or more of the data entry fields in response to the one or more data confirmations from the call center agent.

11. The method of claim 10, wherein the step of entering comprises automatically entering the recognizable characters corresponding to the data entry field in the data entry application.

12. The method of claim 10, further comprising:
    retrieving a recorded voice file;
    converting the voice file to an audio signal; and
    transmitting the audio signal to the caller.

13. The method of claim 12, further comprising:
    converting the characters corresponding to the data entry field to an audio signal;
    combining the audio signal of the characters corresponding to the data entry field with the audio signal of the voice file; and
    transmitting the combined audio signals to the caller.

14. The method of claim 10, further comprising:
    indicating the recognizable characters corresponding to the data entry field; and
    receiving input from the call center agent to input the recognizable characters corresponding to the data entry field into the data entry application.

15. The method of claim 10, wherein the steps of the method are performed by logic embodied in a computer readable medium.

16. A method for speech recognition assisted data entry comprising:

establishing a communication connection between a caller and a call center agent;

designating a first data entry field selected by the call center agent in a data entry application;

activating a speech recognition application in response to the selection of the first data entry field;

receiving first data from the caller;

converting the first data to recognizable characters using the speech recognition application in the first data entry field of the data entry application;

after the data is converted, designating a second data entry field selected by the call center agent;

receiving second data from the caller; and converting the second data to recognizable characters using the speech recognition application in the second data entry field of the data entry application.

17. The method of claim 16, further comprising:

retrieving a recorded voice file;

converting the voice file to an audio signal; and transmitting the audio signal to the caller.

18. The method of claim 17, further comprising transmitting the combined audio signal to a speaker accessible by the call center agent.

19. The method of claim 18, further comprising transmitting the combined audio signal to a speaker accessible by a call center agent.

20. The method of claim 16, further comprising:

retrieving a recorded voice file;

converting the voice file to an audio signal; and transmitting the audio signal to the caller.

21. The method of claim 15, wherein the steps of the method are performed by logic embodied in a computer readable medium.

22. A system for speech recognition assisted data entry, comprising:

means for initiating a communication connection between a caller and a call center agent;

means for activating a speech recognition application in response to a request from the call center agent;

means for receiving data from the caller via the communication connection;

means for converting the data to recognizable characters using the speech recognition application;

means for storing the recognizable characters in a converted cache;

means for applying a set of recognition rules to the recognizable characters stored in the converted cache to automatically determine the recognizable characters corresponding to a data entry field of a data entry application;

means for indicating to the call center agent the recognizable characters that correspond to the one or more data entry fields;

means for receiving one or more data confirmations from the call center agent; and means for entering the recognizable characters that correspond to the data entry fields into one or more of the data entry fields in response to the one or more confirmations from the call center agent.

23. A method for speech recognition assisted data entry, comprising:

initiating a communication connection between a caller and a call center agent;

activating a speech recognition application in response to a request from the call center agent;

receiving data from the caller via the communication connection;

converting the data into recognizable characters using a speech recognition application;

applying a set of recognition rules to the data to identify recognizable characters corresponding to one or more data entry fields of a data entry application, the recognition rules comprising:

a first rule for determining the data entry field corresponding to numerical data based on a count of numerals in the numerical data;

a second rule for determining the recognizable characters of a first corresponding data entry field based on a second corresponding data entry using a nested table, the nested table providing a plurality of first entries and a plurality of second entries, each second entry corresponding to a subset of the first entries; and a dictionary for identifying words associated with data entry fields of the data entry application that receive the words; and based on application of the recognition rules, entering the recognizable characters into one or more of the data entry fields.

* * * * *